F. W. ATKINSON.
AUTOMATIC COUPLING FOR RAILWAY AND OTHER VEHICLES.
APPLICATION FILED MAR. 13, 1920.

1,366,237.

Patented Jan. 18, 1921.
3 SHEETS—SHEET 1.

Inventor
Frederick W Atkinson

By

Attorney

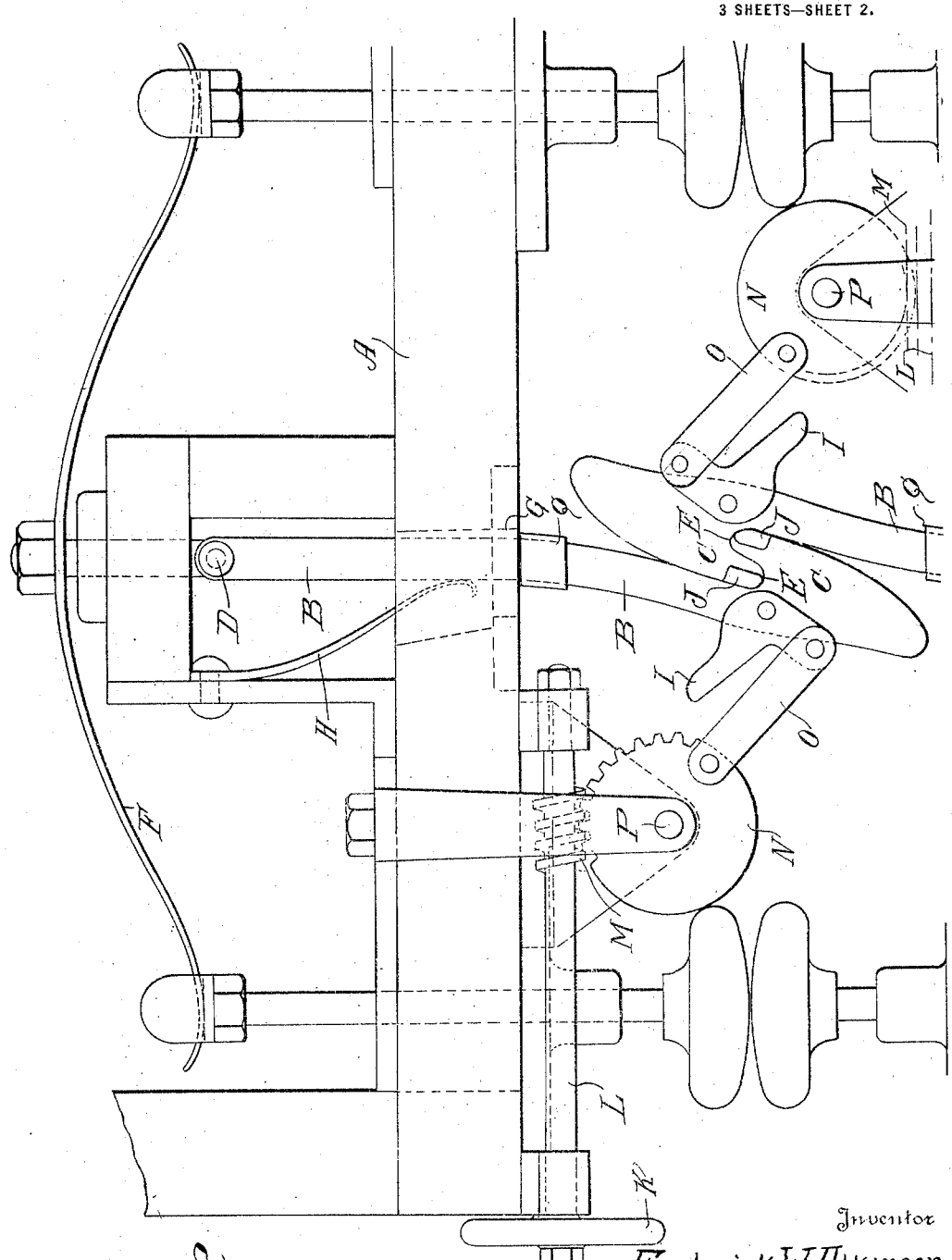

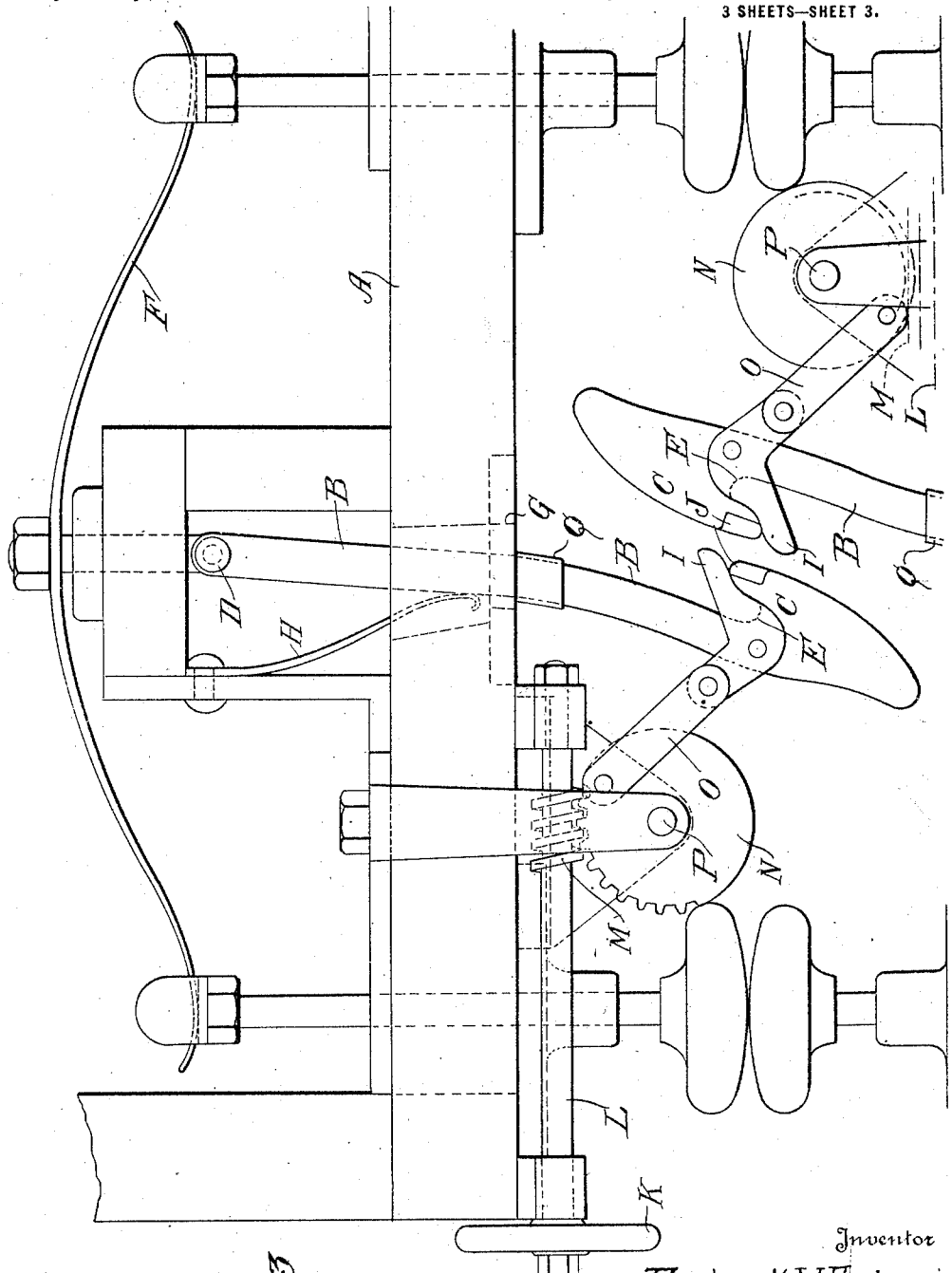

UNITED STATES PATENT OFFICE.

FREDERICK WILLIAM ATKINSON, OF LEEDS, ENGLAND.

AUTOMATIC COUPLING FOR RAILWAY AND OTHER VEHICLES.

1,366,237.      Specification of Letters Patent.      Patented Jan. 18, 1921.

Application filed March 13, 1920. Serial No. 365,568.

*To all whom it may concern:*

Be it known that I, FREDERICK WILLIAM ATKINSON, a subject of the King of Great Britain and Ireland, residing at Leeds, in the county of York, England, have invented new and useful Improvements in Automatic Couplings for Railway and other Vehicles, of which the following is a specification.

This invention relates to automatic couplings for railway and like vehicles, the object being to provide a coupling device which shall be entirely automatic in engagement, securely wedged and interlocked after engagement and during transit, adapted to be readily released by an operator on either side of the train without the operator having to pass between the vehicles, and adapted to be readily locked in the disengaged position so as to be inoperative at will, as for example during shunting operations, the coupling device at the same time being cheap and simple in construction, and applicable either to new or old rolling stock.

My invention relates more particularly to automatic couplings of the known type in which a side hook on the outer end of the draw-bar of one vehicle engages with a complementary side hook on the draw-bar of the adjacent vehicle under the influence of longitudinal and lateral springs operating in conjunction with a knuckle joint toward the inner end of each draw-bar and with a laterally slotted front bearing for each draw-bar, and in which said hooked draw-bars are disengaged, temporarily held in such disengaged positions, and reset in their engaging positions, by intermediate mechanism actuated from a wheel, crank, lever, or rod at one side or other of the vehicle.

For the attainment of my object as aforesaid my invention consists in the improved construction and combination of safety releasing locking and resetting gear as hereinafter more fully described and claimed, and in the particular construction and combination of parts constituting the improved automatic coupling as described with reference to the drawings.

*Description of accompanying drawings.*

Fig. 2 is a plan of same showing the coupling in interlocking engagement.

Fig. 3 is a plan of same showing the coupling locked in its disengaged and inoperative position.

Figure 1:
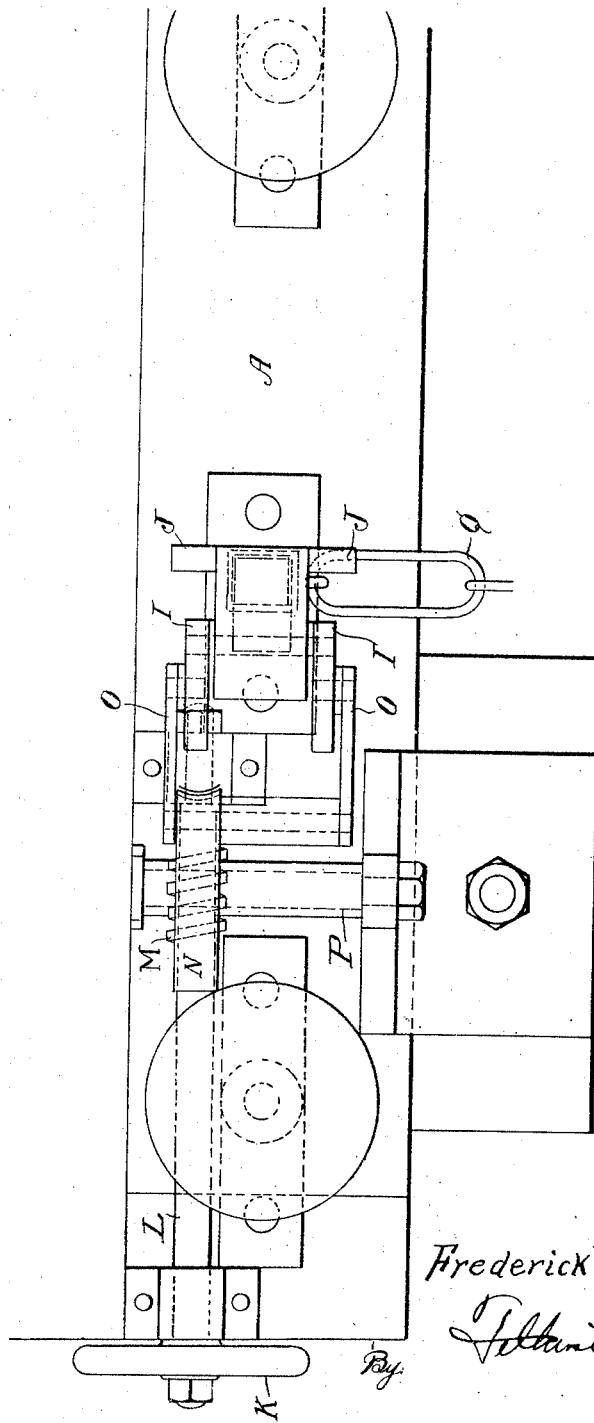
Figure 1 is an end elevation of my improved coupling device as applied to the underframe of a railway wagon.

According to my said invention the underframe A of each wagon or vehicle is fitted centrally at each end with a spring draw-bar B having an inclined side wedge hook C toward its outer end and a knuckle joint D toward its inner end. Behind the hook C of each draw-bar is a correspondingly shaped recess E permitting of mutual interlocking engagement between the respective hooks C of adjacent draw-bars. Each hook C is tapered and is machined both on its inner and outer surfaces so as to insure a perfect fit and an effective wedge action between the engaging pair of hooks. The draw-bars B have the usual longitudinal spring movement, this in the example shown being controlled by the buffer springs F, and their front bearings are provided respectively with lateral slots G and side springs H so as to allow each draw-bar the slight lateral play necessary for interlocking engagement with its complementary draw-bar on the adjacent wagon or vehicle, and for the disengaging movement into the inoperative position.

Each draw-bar B carries, on its upper and lower faces respectively, a pair of pivoted cam fingers I adapted to traverse over the recess E and to engage normally and respectively with a pair of projecting noses J on the side hook C of the complementary draw-bar. These cam fingers I are controlled from a crank handle or wheel K on one side of the wagon or vehicle, by means of a transverse worm shaft L, worm M, worm segment wheel N, and link or links O, the worm segment wheel N being mounted on an upright spindle P, and its rotary movement in either direction being limited by the extent of its toothed segment.

The operation of the apparatus is as follows:—On the two wagons or vehicles coming into contact, the hooks C of their respective draw-bars B automatically engage and the coupling is instantly and automatically interlocked and wedged (see Fig. 2). To release the coupling, the crank handle or wheel K on one side or the other is turned to draw laterally the link or links O of its respective draw-bar, this movement pushing back the corresponding pair of cam fingers I against the projecting noses J of the second or complementary draw-bar hook, or against the face itself of this hook in case the draw-bars are on a different level, and thereby gradually and smoothly disengaging the coupling. During this movement the hook recess E is closed by the cam fingers I (see Fig. 3), so that reëngagement of the hooks is rendered impossible until the cam fingers are withdrawn by a return movement of the crank handle or wheel. By a continuation of the releasing movement of the crank handle or wheel K, the cam fingers I are pushed farther back into contact with the projecting noses J on the first draw-bar hook, so that the continued releasing movement pulls the draw-bar laterally back out of the path of its complementary draw-bar, thereby locking the coupling for the time being in its disengaged and inoperative position (see Fig. 3), until reset by a return movement of the crank handle or wheel K.

Each draw-bar B is also fitted at Q with an emergency coupling chain for coupling up to the draw-bars of rolling stock of ordinary type.

I claim:

1. An automatic interlocking coupling device of the type described, having a safety releasing locking and resetting gear at each end of each vehicle comprising, in combination, drawbars each provided with a wedge hook on the outer end, a crank handle or wheel on one side of the vehicle, a transverse worm shaft carrying said crank handle or wheel, a worm on said shaft, an upright spindle, a worm segment wheel thereon, links connected to a pair of projecting noses on the inclined side of a wedge hook of the draw-bar, and a pair of cam fingers controlled by said links and pivoted on the upper and lower faces respectively of the draw-bar so as to engage with projecting noses of a wedge hook on an adjacent vehicle, substantially as herein set forth.

2. A coupling device of the class described comprising a drawbar having a wedge hook on the outer end and a knuckle joint toward the inner end of the drawbar, a projecting nose on the hook, a cam pivotally mounted on the drawbar, a wheel pivotally mounted on the vehicle, a link connecting the wheel to one of the free ends of the cam, the other free end of the cam being adapted to engage the projecting nose on a hook mounted on a companion coupling and means for rotating the wheel.

FREDERICK WILLIAM ATKINSON.